United States Patent
Lee et al.

(10) Patent No.: US 11,000,815 B2
(45) Date of Patent: May 11, 2021

(54) AUTOMATIC MIXING MACHINE

(71) Applicant: JU WORKS LTD., New Taipei (TW)

(72) Inventors: Chun-Chieh Lee, New Taipei (TW);
Yen-Wei Liu, New Taipei (TW);
Hsun-Chang Wang, New Taipei (TW);
Yu-Ming Chan, New Taipei (TW)

(73) Assignee: JU WORKS LTD., New Taipei (TW)

( * ) Notice: Subject to any disclaimer, the term of this patent is extended or adjusted under 35 U.S.C. 154(b) by 0 days.

(21) Appl. No.: 16/686,292

(22) Filed: Nov. 18, 2019

(65) Prior Publication Data
US 2020/0156030 A1  May 21, 2020

(30) Foreign Application Priority Data

Nov. 21, 2018 (TW) ................... 107215781

(51) Int. Cl.
*B01F 15/00* (2006.01)
*B01F 3/08* (2006.01)
*H04W 4/80* (2018.01)

(52) U.S. Cl.
CPC ...... *B01F 15/00253* (2013.01); *B01F 3/0853* (2013.01); *B01F 15/00201* (2013.01); *H04W 4/80* (2018.02); *B01F 2003/0842* (2013.01)

(58) Field of Classification Search
CPC .. B01F 3/00; B01F 3/08; B01F 3/0807; B01F 3/0853; B01F 15/00; B01F 15/00123; B01F 15/00201; B01F 15/00253; B01F 2003/0823; B01F 2003/0842
See application file for complete search history.

(56) References Cited

U.S. PATENT DOCUMENTS 9,447,369 B2 * 9/2016 Schaible ................ C11D 13/16

FOREIGN PATENT DOCUMENTS

CN 203904316 U * 10/2014

OTHER PUBLICATIONS

Machine translation of CN 203904316U, which was published on Oct. 29, 2014. (Year: 2014).*

* cited by examiner

*Primary Examiner* — Natasha E Young
(74) *Attorney, Agent, or Firm* — McClure, Qualey & Rodack, LLP

(57) ABSTRACT

An automatic mixing machine includes a vessel, a shell, a motor, a mixing unit, a detection and feedback unit, a computing control unit and a drive unit. The shell is connected with the vessel to form a closed space. The motor is arranged in the shell. The first end of the mixing unit is connected with the motor, and the second end of the mixing unit extends into the closed space. The detection and feedback unit is electrically connected with the motor and collects at least one electric parameter of the motor. The computing control unit is electrically connected with the detection and feedback unit and generates a control signal according to the electric parameters and the mixing parameters. The drive unit is electrically connected with the computing control unit and the motor respectively, and outputs a drive signal to drive the motor according to the control signal.

8 Claims, 3 Drawing Sheets

AUTOMATIC MIXING MACHINE

CROSS REFERENCE TO RELATED APPLICATIONS

This Non-provisional application claims priority under 35 U.S.C. § 119(a) on Patent Application No. 107215781 filed in Republic of China on Nov. 21, 2018, the entire contents of which are hereby incorporated by reference.

BACKGROUND OF THE INVENTION

Field of the Invention

The present invention relates to a mixer, in particular, to an automatic mixing machine used in the manufacture of cleaning products.

Descriptions of the Related Art

The handmade soap is a soap made manually by using natural oils and lye. The common natural oils include olive oil, palm oil, and coconut oil. The lye is usually an aqueous solution of sodium hydroxide or potassium hydroxide. Based on personal preferences and purposes, a variety of different additives, such as milk, breast milk, soy milk, essential oil, essence, flowers and plants, traditional Chinese medicinal materials, bamboo charcoal powder, preservatives, dyes and so on, may be added in the handmade soap. So in recent years a lot of people have invested in this technique and made it part of their lives.

The change of oil and lye into "soap" after mixing with water is called "saponification". In order to fully mix the oil with the lye and other additives and effectively shorten the saponification reaction time, "mixing" is a particularly important step of manual soap processing. The current mixing method is divided into "manual mixing" and "mechanical mixing". Manual mixing is carried out by the user with a mixing bar, while mechanical mixing is carried out by the user with an electric mixing bar (for example, an electric food mixing bar). In the process, it is possible to cause liquid splashing, or it is not easy to control the saponification, causing excessive saponification reaction and making failure.

At present, no special mixing tool is available to manufacture the handmade soap, and during manufacturing the users are required to decide whether saponification has been completed and whether mixing is stopped. This will not only affect the quality of even mixing, but also make the processing efficiency low. At the same time, it is possible to cause the waste of raw materials due to adhesion and other reasons, thus increasing the processing cost of the handmade soap.

Therefore, it is one of the important subjects to provide an automatic mixing machine to solve the above problems and reduce the risk of production failure by the user.

SUMMARY OF THE INVENTION

In view of the foregoing, one of the purposes of the present invention is to provide an automatic mixing machine that can control the mixing according to different ingredients and can stop the mixing after judging that saponification has been completed.

To achieve the above purpose, the present invention provides an automatic mixing machine including a vessel, a shell, a motor, a mixing unit, a detection and feedback unit, a computing control unit and a drive unit. The vessel is used for accommodating the raw materials. The shell is connected with the vessel to form a closed space. The motor is arranged in the shell. The first end of the mixing unit is connected with the motor, and the second end extends into the closed space. The detection and feedback unit is electrically connected with the motor and collects at least one electric parameter of the motor. The computing control unit is electrically connected with the detection and feedback unit and generates a control signal according to the electric parameters and the mixing parameters. The drive unit is electrically connected with the computing control unit and the motor respectively, and outputs a drive signal to drive the motor according to the control signal. The electric parameter is related to the degree of saponification of the raw material after stirring by the mixing unit so as to decide the drive signal output by the drive unit.

In one of the embodiment according to the present invention, the automatic mixing machine further includes a parameter setting unit electrically connected with the computing control unit and used for storing a plurality of the mixing parameters including the above mixing parameter.

In one of the embodiment according to the present invention, wherein these mixing parameters may be input to the parameter setting unit by an input unit.

In one of the embodiment according to the present invention, wherein these mixing parameters may be input to the parameter setting unit by a wireless transmission unit.

In one of the embodiment according to the present invention, the wireless transmission unit may be a Bluetooth transmission unit, a Wi-Fi transmission unit, a RFID transmission unit, or a NFC transmission unit.

In one of the embodiment according to the present invention, the mixing parameters may include one of the ingredient of the raw material, the raw material mixing ratio, the concentration setting of the raw material, the mixing time of the raw material, and the mixing speed of the raw material.

In one of the embodiment according to the present invention, wherein the electric parameters may include voltage parameter, current parameter, or power parameter.

In one of the embodiment according to the present invention, wherein the raw material may include oil, water and lye.

As mentioned above, the automatic mixing machine according to the present invention controls the speed of the motor or stops the motor by the detection and feedback unit commanding the computing control unit to judge whether the saponification is completed according to the feedback signal of the motor.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DESCRIPTION OF THE PREFERRED EMBODIMENT

In the following description, this invention will be explained with reference to embodiments thereof. However, the description of these embodiments is only for purposes of illustration rather than limitation. It should be appreciated that in the following embodiments and attached drawings, elements unrelated to this invention are omitted from depictions; and dimensional relationships among individual elements in the attached drawings are illustrated only for ease of understanding, but not to limit the actual scale.

Figure 1:
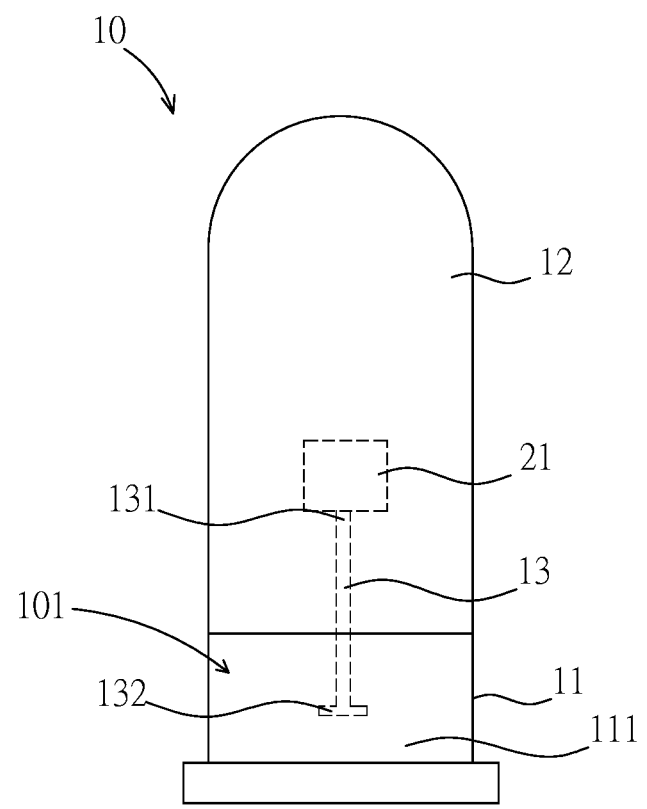
FIG. 1 is an appearance diagram showing an automatic mixing machine.

As shown in FIG. 1, the automatic mixing machine 10 according to an embodiment of the present invention includes a vessel 11, a shell 12, a motor 21 and a mixing unit 13. In this embodiment, the automatic mixing machine 10 may be used to mix the raw material for the cleaning products and stop automatically after judging that the mixing is completed. More specifically, the automatic mixing machine 10 may be used in the mixing procedure needing the saponification reaction of the cleaning product production process (e.g. fancy soap), and automatically stop mixing after the saponification.

The vessel 11 may be made of plastic, glass, metal, or the like without limitation. The vessel 11 includes an accommodating space 111 used for accommodating the raw materials, and the raw materials includes the oil, water and lye for saponification. In other embodiments, the raw materials further include essential oil, essence and other materials used for manufacturing the fancy soap.

The shell 12 is connected with the vessel 11 to from a closed space 101. The motor 21 is arranged in the shell 12. The first end 131 of the mixing unit 13 is connected with the motor 21, and the second end 132 extends into the closed space 101. The mixing unit 13 is driven by the motor 21 to mix the raw materials in the closed space 101, and liquid splashing may be avoided by mixing in the closed space 101.

Figure 2:
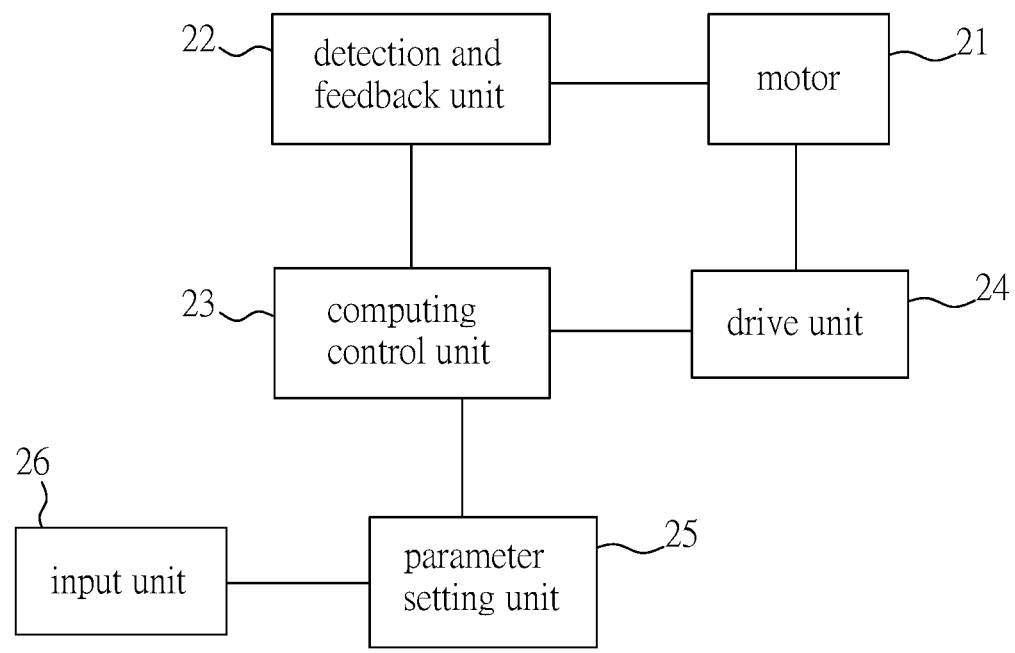
FIG. 2 is a schematic diagram showing the electric control block chart of the automatic mixing machine.

FIG. 2 shows the electric control block chart of the automatic mixing machine 10. In addition to the above motor 21, the electric control unit of the automatic mixing machine 10 further includes a detection and feedback unit 22, a computing control unit 23, a drive unit 24, a parameter setting unit 25 and an input unit 26.

The detection and feedback unit 22 is electrically connected with the motor 21 and collects at least one electric parameter of the motor 21. The electric parameters may include voltage parameter, current parameter, power parameter, or the like. Because the raw materials become thicker after the saponification, resistance may be increased to affect the electric parameters of the motor, for example, the voltage raises with the impedance increase.

The computing control unit 23 is electrically connected with the detection and feedback unit 22, the drive unit 24 is electrically connected with the computing control unit 23 and the motor 21 respectively, and the parameter setting unit 25 is electrically connected with the computing control unit 23.

The computing control unit 23 generates and transmits a control signal to the drive unit 24 according to the electric parameters and the mixing parameters.

The drive unit 24 outputs a drive signal to the drive the motor 21 according to the control signal, wherein, the driven signal may command the motor 21 to operate or stop. More specifically, the drive signal may be pulse-width-modulation (PWM) signal, which may be used to regulate the speed of the motor 21.

The parameter setting unit 25 is used to store a plurality of the mixing parameters including the above mixing parameter, and the mixing parameters may correspond to the formula of different raw materials. Additionally, the mixing parameters may include the ingredient or the mixing ratio of the formula and may be input to the parameter setting unit 25 by the input unit 26. In other embodiments, the mixing parameters may be preset in the factory.

The input unit 26 may be the wireless transmission unit, such as Bluetooth transmission unit, Wi-Fi transmission unit, RFID transmission unit or NFC transmission unit, without limitation.

Figure 3:
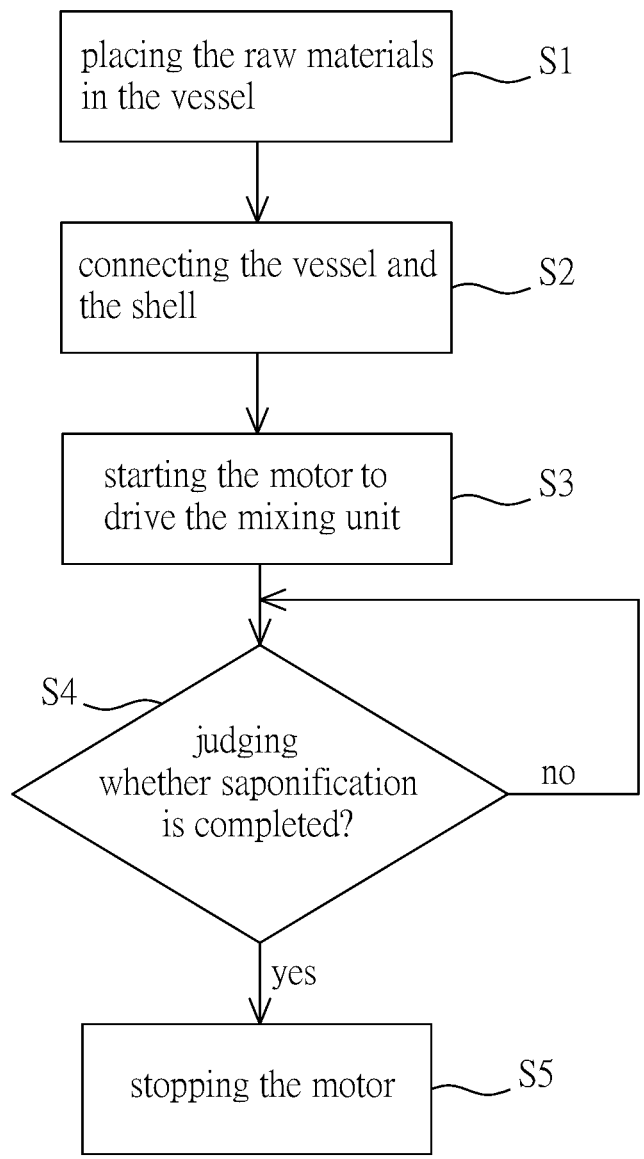
FIG. 3 is a flow chart showing operation flow of the automatic mixing machine according to the embodiment of the present invention.

The following provides the operation flow of the automatic mixing machine of the better embodiment according to the present invention by reference of the abovementioned and FIG. 3. As shown in FIG. 3, operation flow of the automatic mixing machine includes Steps 1 to 5.

Step S1 is to place the raw materials in the vessel 11. The raw material can be in a single package. After unpacking, the user can place the raw materials in the accommodating space 111 of the vessel 11, so the user may easily operate the mixture.

Step S2 is to connect the vessel 11 and the shell 12 to form the closed space 101.

Step S3 is to start the motor 21 so that the mixing unit 13 is driven by the motor 21 to mix the raw materials in the closed space 101. In this embodiment, the initial speed of the motor 21 may be determined according to the mixing parameters stored in the parameter setting unit 25, and the user may select the mixing parameters of the raw materials provided in the above-mentioned steps.

Step S4 is to compare the mixing parameter with the electric parameter of the motor 21 by the computing control unit 23 to determine the electric parameters are equal to the mixing parameter so as to judge whether saponification is completed. If the result is "yes", Step 5 is performed, and if the result is "no", Step 4 is continuously performed.

Step S5 is to stop the motor 21. In this embodiment, the speed or the operation of the motor is controlled by controlling the drive signal output from the drive unit 24. Additionally, after saponification, the automatic mixing machine 10 gives an alarm sound by a loudspeaker or light effect while the motor 21 stops.

After the saponification, the vessel 11 is disconnected from the shell 12, saponified liquid is transferred to a mold for solidification.

In summary, the automatic mixture according to the present invention judges whether the saponification is completed by the detection and feedback unit according to the electric parameter of the motor, and stops mixing according to the results. The user can easily prepare liquid soap and prevent failure resulting from excessive mixing.

The above embodiments merely give the detailed technical contents of the present invention and inventive features thereof, and are not to limit the covered range of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An automatic mixing machine, comprising:
a vessel, which is used for accommodating the raw materials;
a shell, which is connected with the vessel to form a closed space;
a motor, which is arranged in the shell;
a mixing unit, which has a first end and a second end, wherein the first end is connected with the motor, and the second end extends into the closed space;
a detection and feedback unit, which is electrically connected with the motor and collects at least one electric parameter of the motor;
a computing control unit, which is electrically connected with the detection and feedback unit and generates a control signal according to the electric parameter and a first mixing parameter; and
a drive unit, which is electrically connected with the computing control unit and the motor respectively, and outputs a drive signal to drive the motor according to the control signal,
wherein the electric parameter is related to the degree of saponification of the raw material after stirring by the mixing unit so as to decide the drive signal output by the drive unit.

2. The automatic mixing machine of claim 1, further comprising:
a parameter setting unit, which is electrically connected with the computing control unit and used for storing a plurality of the mixing parameters including the first mixing parameter.

3. The automatic mixing machine of claim 2, wherein the mixing parameters is input to the parameter setting unit by an input unit.

4. The automatic mixing machine of claim 2, wherein the mixing parameters is input to the parameter setting unit by a wireless transmission unit.

5. The automatic mixing machine of claim 4, wherein the wireless transmission unit selects from one of a Bluetooth transmission unit, a Wi-Fi transmission unit, a RFID transmission unit, or a NFC transmission unit.

6. The automatic mixing machine of claim 1, wherein the mixing parameters comprise at least one of the ingredient of the raw material, the raw material mixing ratio, the concentration setting of the raw material, the mixing time of the raw material, and the mixing speed of the raw material.

7. The automatic mixing machine of claim 1, wherein the electric parameter comprises at least one of the voltage parameter, the current parameter and the power parameter.

8. The automatic mixing machine of claim 1, wherein the raw material comprises at least one of oil, water and lye.

* * * * *